US010220821B2

United States Patent
Matsuno

(10) Patent No.: US 10,220,821 B2
(45) Date of Patent: Mar. 5, 2019

(54) VEHICLE BRAKING FORCE CONTROLLING APPARATUS

(71) Applicant: SUBARU CORPORATION, Tokyo (JP)

(72) Inventor: Koji Matsuno, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 15/669,265

(22) Filed: Aug. 4, 2017

(65) Prior Publication Data
US 2018/0065604 A1    Mar. 8, 2018

(30) Foreign Application Priority Data

Sep. 7, 2016    (JP) .................................. 2016-174333

(51) Int. Cl.
| | |
|---|---|
| *B60T 8/1755* | (2006.01) |
| *B60T 8/171* | (2006.01) |
| *B60T 8/175* | (2006.01) |
| *B60T 8/26* | (2006.01) |
| *B60T 8/48* | (2006.01) |

(52) U.S. Cl.
CPC ............ *B60T 8/1755* (2013.01); *B60T 8/171* (2013.01); *B60T 8/175* (2013.01); *B60T 8/26* (2013.01); *B60T 8/48* (2013.01); *B60T 2201/16* (2013.01); *B60T 2220/04* (2013.01)

(58) Field of Classification Search
CPC ........ B60T 8/1755; B60T 8/171; B60T 8/175; B60T 8/26; B60T 2201/16; B60T 2220/04
USPC ................. 701/82, 70, 72, 78; 303/140, 146
See application file for complete search history.

(56) References Cited

U.S. PATENT DOCUMENTS

| 6,089,680 A * | 7/2000 | Yoshioka .............. B60T 8/1755 303/140 |
| 2013/0245910 A1 | 9/2013 | Watanabe |
| 2015/0112568 A1* | 4/2015 | Hirota ................... B60T 8/1755 701/72 |

(Continued)

FOREIGN PATENT DOCUMENTS

| JP | H05-016780 A | 1/1993 |
| JP | 2008-105589 A | 5/2008 |

(Continued)

OTHER PUBLICATIONS

Notification of Reasons for Refusal issued in corresponding Japanese Patent Application No. 2016-174333, dated Apr. 10, 2018.

*Primary Examiner* — Marthe Y Marc-Coleman
(74) *Attorney, Agent, or Firm* — McDermott Will & Emery LLP

(57) ABSTRACT

A vehicle braking force controlling apparatus includes a steered start detector and a controller. The steered start detector detects steered start of a vehicle on a basis of a driving state of the vehicle. The vehicle has a plurality of wheels. The steered start is start of the vehicle in which steering is performed. The controller applies braking force to a turning inner front wheel and braking force to a turning outer rear wheel when the steered start of the vehicle is detected by the steered start detector. The turning inner front wheel is a front wheel of the plurality of wheels which is located on inner side upon turning of the vehicle. The turning outer rear wheel is a rear wheel of the plurality of wheels which is located on outer side upon the turning of the vehicle.

19 Claims, 8 Drawing Sheets

(56) References Cited

U.S. PATENT DOCUMENTS

2018/0037201 A1    2/2018   Yamazaki et al.

FOREIGN PATENT DOCUMENTS

| | | |
|---|---|---|
| JP | 2012-111387 A | 6/2012 |
| JP | 2012-254651 A | 12/2012 |
| WO | 2016/136968 A1 | 9/2016 |

* cited by examiner

VEHICLE BRAKING FORCE CONTROLLING APPARATUS

CROSS-REFERENCE TO RELATED APPLICATIONS

The present application claims priority from Japanese Patent Application No. 2016-174333 filed on Sep. 7, 2016, the entire contents of which are hereby incorporated by reference.

BACKGROUND

The technology relates to a vehicle braking force controlling apparatus that applies braking force to a specific wheel of a vehicle that drives at least rear wheels and thereby improves turning capability and stability upon the steered start of the vehicle.

A technique has been known that applies braking force to an inner wheel located on the inner side when a vehicle turns, i.e., a "turning inner wheel", of a vehicle and thereby improves turning performance. For example, Japanese Unexamined Patent Application Publication (JP-A) No. 2008-105589 discloses a technique related to a vehicle braking force controlling apparatus in which a brake control directed to turning is performed to apply braking force to a rear wheel located on the inner side of the turning of a vehicle, i.e., a "turning inner rear wheel", in a case where a steering angle of a steering wheel is determined as being equal to or greater than a steering angle threshold. The vehicle braking force controlling apparatus disclosed in JP-A No. 2008-105589 causes the braking force applied to the turning inner rear wheel of the vehicle to be less than the braking force that is to be applied to the turning inner rear wheel of the vehicle in a case where a vehicle speed is equal to or greater than a preset decreasing vehicle speed threshold, on a condition that the braking force is applied to the turning inner rear wheel and the vehicle speed is less than the decreasing vehicle speed threshold.

SUMMARY

When taking into consideration a trajectory upon turning and vehicle stability in a case where a vehicle such as an all-wheel drive vehicle starts while performing steering on a location such as a snow road, it is effective to perform assistance of turning-round capability and prevention of a drive slip in combination in such a case. The assistance of turning-round capability may be achieved through application of braking force to a turning inner wheel. The prevention of a drive slip may be achieved through application of the braking force to a rear wheel.

In addition, a vehicle braking force controlling apparatus disclosed in JP-A No. 2008-105589 reduces the braking force to be applied upon the start. JP-A No. 2008-105589 discloses that this has an effect of reducing a sense of dragging that causes a driver to feel as if an actual acceleration rate in a traveling direction of a vehicle is lower than an acceleration rate in the traveling direction of the vehicle which the driver expects, and an effect of suppressing an abnormal noise generated from a turning inner rear wheel when the vehicle starts while the braking force is applied to the turning inner rear wheel. However, it is not possible to apply the technique disclosed in JP-A No. 2008-105589 to a control of starting the vehicle which is to be performed from a state where a function of keeping the braking force, i.e., a "braking force keeping function", is active. The braking force keeping function keeps, during the transition from a stopped state to a start state of the vehicle, the braking force derived from the stopped state, and is in widespread use in recent years.

It is desirable to provide a vehicle braking force controlling apparatus that improves turning-round capability through appropriate application of a yaw moment and vehicle stability through effective prevention of a slip both upon the steered start of a vehicle without causing a driver to feel a sense of dragging and without causing the driver to sense a braking abnormal noise, even for a vehicle having a braking force keeping function.

An aspect of the technology provides a vehicle braking force controlling apparatus that includes: a steered start detector configured to detect steered start of a vehicle on a basis of a driving state of the vehicle, in which the vehicle has a plurality of wheels, and in which the steered start is start of the vehicle in which steering is performed; and a controller configured to apply braking force to a turning inner front wheel and braking force to a turning outer rear wheel when the steered start of the vehicle is detected by the steered start detector. The turning inner front wheel is a front wheel of the plurality of wheels which is located on inner side upon turning of the vehicle. The turning outer rear wheel is a rear wheel of the plurality of wheels which is located on outer side upon the turning of the vehicle.

An aspect of the technology provides a vehicle braking force controlling apparatus that includes: a steered start detector configured to detect steered start of a vehicle on a basis of a driving state of the vehicle, in which the vehicle has a plurality of wheels, and in which the steered start is start of the vehicle in which steering is performed; and a controller that has a braking force keeping function, and is configured to release immediately only braking force applied to a turning outer front wheel and braking force applied to a turning inner rear wheel and apply braking force to a turning inner front wheel and braking force to a turning outer rear wheel when the steered start of the vehicle is detected by the steered start detector. The braking force keeping function keeps, during a transition from a stopped state of the vehicle to a start state of the vehicle, braking force derived from the stopped state. The turning outer front wheel is a front wheel of the plurality of wheels which is located on outer side upon turning of the vehicle. The turning inner rear wheel is a rear wheel of the plurality of wheels which is located on inner side upon the turning of the vehicle. The turning inner front wheel is a front wheel of the plurality of wheels which is located on the inner side upon the turning of the vehicle. The turning outer rear wheel is a rear wheel of the plurality of wheels which is located on the outer side upon the turning of the vehicle.

An aspect of the technology provides a vehicle braking force controlling apparatus that includes circuitry. The circuitry is configured to detect steered start of a vehicle on a basis of a driving state of the vehicle, in which the vehicle has a plurality of wheels, and in which the steered start is start of the vehicle in which steering is performed, and apply braking force to a turning inner front wheel and braking force to a turning outer rear wheel when the steered start of the vehicle is detected. The turning inner front wheel is a front wheel of the plurality of wheels which is located on inner side upon turning of the vehicle. The turning outer rear wheel is a rear wheel of the plurality of wheels which is located on outer side upon the turning of the vehicle.

An aspect of the technology provides a vehicle braking force controlling apparatus that includes circuitry having a braking force keeping function. The circuitry is configured to detect steered start of a vehicle on a basis of a driving state of the vehicle, in which the vehicle has a plurality of wheels, and in which the steered start is start of the vehicle in which steering is performed, and release immediately only braking force applied to a turning outer front wheel and braking force applied to a turning inner rear wheel and apply braking force to a turning inner front wheel and braking force to a turning outer rear wheel when the steered start of the vehicle is detected. The braking force keeping function keeps, during a transition from a stopped state of the vehicle to a start state of the vehicle, braking force derived from the stopped state. The turning outer front wheel is a front wheel of the plurality of wheels which is located on outer side upon turning of the vehicle. The turning inner rear wheel is a rear wheel of the plurality of wheels which is located on inner side upon the turning of the vehicle. The turning inner front wheel is a front wheel of the plurality of wheels which is located on the inner side upon the turning of the vehicle. The turning outer rear wheel is a rear wheel of the plurality of wheels which is located on the outer side upon the turning of the vehicle.

BRIEF DESCRIPTION OF THE DRAWINGS

FIGS. 4A to 4C describe characteristics of a delay time tb of starting reduction of a brake fluid pressure according to one implementation of the technology, in which FIG. 4A illustrates an example of characteristics of a delay time tb1 of starting the reduction of the brake fluid pressure which is set on the basis of a steering angle, FIG. 4B illustrates an example of characteristics of a delay time tb2 of starting the reduction of the brake fluid pressure which is set on the basis of an accelerator position, and FIG. 4C illustrates an example of characteristics of a delay time tb3 of starting the reduction of the brake fluid pressure which is set on the basis of a speed of pressing down on an accelerator pedal.

FIGS. 5A to 5C describe characteristics of a brake fluid pressure control value Pb according to one implementation of the technology, in which FIG. 5A illustrates an example of characteristics of a brake fluid pressure control value P1 set on the basis of the steering angle, FIG. 5B illustrates an example of characteristics of a brake fluid pressure control value P2 set on the basis of the accelerator position, and FIG. 5C illustrates an example of characteristics of a brake fluid pressure control value P3 set on the basis of the speed of pressing down on the accelerator pedal.

DETAILED DESCRIPTION

In the following, a description is given of one implementation of the technology with reference to the accompanying drawings.

Figure 1:
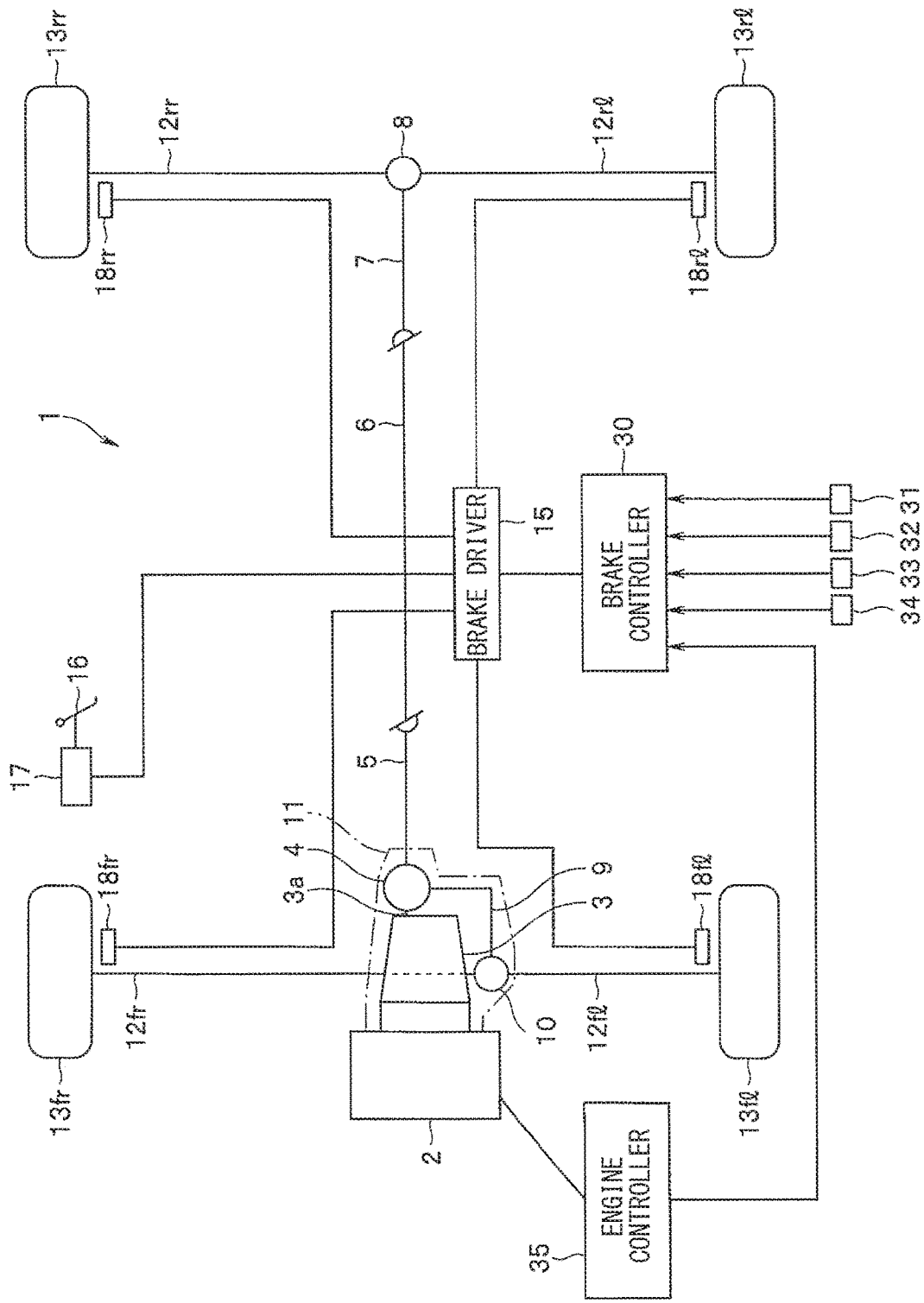
FIG. 1 describes a schematic configuration of a vehicle on which a vehicle braking force controlling apparatus according to one implementation of the technology is mounted.

Referring to FIG. 1, a vehicle 1 may have an engine 2 disposed at a front part of the vehicle 1, an automatic transmission 3 disposed at the rear of the engine 2, and a center differential 4. The drive force generated by the engine 2 may be transmitted from the automatic transmission 3 to the center differential 4 through a transmission output shaft 3a. The automatic transmission 3 is illustrated as including a device such as a torque converter in FIG. 1.

The drive force transmitted to the center differential 4 may be delivered from the center differential 4 to a rear wheel final reduction device 8 through a rear drive shaft 5, a propeller shaft 6, and a drive pinion 7. The drive force may also be delivered from the center differential 4 to a front wheel final reduction device 10 through a front drive shaft 9. The devices including the automatic transmission 3, the center differential 4, and the front wheel final reduction device 10 may be provided integrally in a casing 11.

The drive force delivered to the rear wheel final reduction device 8 may be transmitted to a left rear wheel 13$rl$ through a rear wheel left drive shaft 12$rl$ and to a right rear wheel 13$rr$ through a rear wheel right drive shaft 12$rr$. The drive force delivered to the front wheel final reduction device 10 may be transmitted to a left front wheel 13$fl$ through a front wheel left drive shaft 12$fl$ and to a right front wheel 13$fr$ through a front wheel right drive shaft 12$fr$.

The vehicle 1 according to the present implementation may be a known all-wheel drive vehicle in which a distribution of drive torque between a front axle and a rear axle is variable freely by controlling engagement force of an unillustrated transfer clutch of the center differential 4.

The vehicle 1 also includes a brake driver 15. The brake driver 15 may be coupled to a master cylinder 17 that is coupled to a brake pedal 16 operated by a driver of the vehicle 1. When the driver operates the brake pedal 16, a brake pressure may be introduced, from the master cylinder 17 through the brake driver 15, into wheel cylinders provided for the respective four wheels, namely, a left front wheel cylinder 18$fl$ provided for the left front wheel 13$fl$, a right front wheel cylinder 18$fr$ provided for the right front wheel 13$fr$, a left rear wheel cylinder 18$rl$ provided for the left rear wheel 13$rl$, and a right rear wheel cylinder 18$rr$ provided for the right rear wheel 13$rr$. The thus-introduced brake pressure results in braking of the left front wheel 13$fl$, the right front wheel 13$fr$, the left rear wheel 13$rl$, and the right rear wheel 13$rr$.

The brake driver 15 may be a hydraulic unit that includes devices such as a pressurizing source, a pressure reducing valve, and a pressure increasing valve. The brake driver 15 may introduce the brake pressures to each of the left front wheel cylinder 18$fl$, the right front wheel cylinder 18$fr$, the left rear wheel cylinder 18$rl$, and the right rear wheel cylinder 18$rr$ freely and independently in accordance with, besides the brake operation performed by the driver, signals supplied from a brake controller 30.

Figure 2:
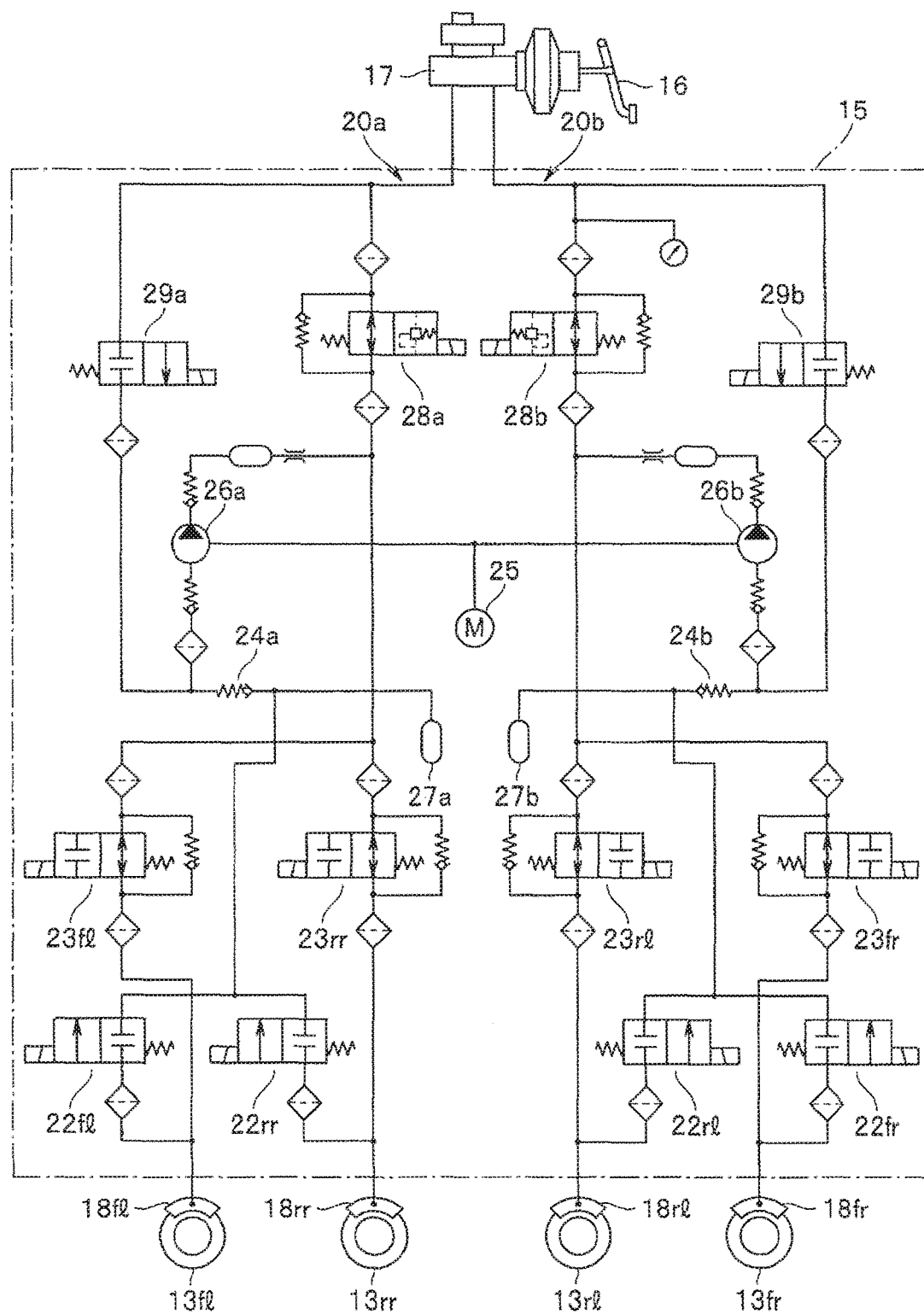
FIG. 2 describes an example of a configuration of a brake driver according to one implementation of the technology.

Specifically, the brake driver 15 may have a configuration as illustrated by way of example in FIG. 2 in which the left rear wheel cylinder 18$rl$, the right rear wheel cylinder 18$rr$, the left front wheel cylinder 18$fl$, and the right front wheel cylinder 18$fr$ are provided respectively for the left rear wheel 13$rl$, the right rear wheel 13$rr$, the left front wheel 13$fl$, and the right front wheel 13$fr$. The left rear wheel cylinder 18$rl$, the right rear wheel cylinder 18$rr$, the left front wheel cylinder 18*fl*, and the right front wheel cylinder 18*fr* each may be coupled to the brake driver 15. The brake driver 15 may include a first brake circuit 20*a* provided for the left front wheel 13*fl* and the right rear wheel 13*rr* and a second brake circuit 20*b* provided for the right front wheel 13*fr* and the left rear wheel 13*rl*. In other words, the brake driver 15 may form a brake system configured by X piping.

The left front wheel cylinder 18*fl*, the right front wheel cylinder 18*fr*, the left rear wheel cylinder 18*rl*, and the right rear wheel cylinder 18*rr* may be coupled to their respective outlet valves 22*fl*, 22*fr*, 22*rl*, and 22*rr*, and coupled to their respective inlet valves 23*fl*, 23*fr*, 23*rl*, and 23*rr*. The outlet valves 22*fl*, 22*fr*, 22*rl*, and 22*rr* and the inlet valves 23*fl*, 23*fr*, 23*rl*, and 23*rr* may be electrically actuated by the brake controller 30.

The outlet valves 22*fl*, 22*fr*, 22*rl*, and 22*rr* may cause the corresponding wheel cylinders 18*fl*, 18*fr*, 18*rl*, and 18*rr* to be in communication, in the first brake circuit 20*a* and the second brake circuit 20*b*, with their corresponding pumps 26*a* and 26*b* through their corresponding check valves 24*a* and 24*b* when the outlet valves 22*fl*, 22*fr*, 22*rl*, and 22*rr* are at their respective actuated positions. The pumps 26*a* and 26*b* may be both driven by a motor 25. The outlet valves 22*fl*, 22*fr*, 22*rl*, and 22*rr* may shut off corresponding flow passages when the outlet valves 22*fl*, 22*fr*, 22*rl*, and 22*rr* are at their respective unexcited basic positions.

The first brake circuit 20*a* may include a low-pressure storage vessel 27*a* provided between the outlet valves 22*fl* and 22*rr* and the pump 26*a*, and the second brake circuit 20*b* may include a low-pressure storage vessel 27*b* provided between the outlet valves 22*rl* and 22*fr* and the pump 26*b*. The inlet valves 23*fl*, 23*fr*, 23*rl*, and 23*rr* may allow for an uninterrupted flow of a pressure medium from the master cylinder 17 through the first and the second brake circuits 20*a* and 20*b*, i.e., through switching valves 28*a* and 28*b*, to the left front wheel cylinder 18*fl*, the right front wheel cylinder 18*fr*, the left rear wheel cylinder 18*rl*, and the right rear wheel cylinder 18*rr* when the inlet valves 23*fl*, 23*fr*, 23*rl*, and 23*rr* are at their respective unexcited basic positions. The pressure medium may be oil or any other fluid. The flow of oil may be shut off when the inlet valves 23*fl*, 23*fr*, 23*rl*, and 23*rr* are actuated.

The first and the second brake circuits 20*a* and 20*b* may respectively include control valves 29*a* and 29*b*. The control valves 29*a* and 29*b* in combination with the switching valves 28*a* and 28*b* may allow for an increase in the brake pressure independently from the operation of the brake pedal 16 performed by the driver. The valves provided in the brake driver 15 may be controlled by the brake controller 30. For example, placing one of the control valves 29*a* and 29*b*, e.g., the control valve 29*a*, in a shut-off state and operating one of the pumps 26*a* and 26*b*, e.g., the pump 26*a*, may allow for an increase in the brake pressure applied to the left front wheel cylinder 18*fl* and the right rear wheel cylinder 18*rr* provided in the first brake circuit 20*a*, independently from the operation of the brake pedal 16 performed by the driver. Likewise, placing the other of the control valves 29*a* and 29*b*, e.g., the control valve 29*b*, in a shut-off state and operating the other of the pumps 26*a* and 26*b*, e.g., the pump 26*b*, may allow for an increase in the brake pressure applied to the right front wheel cylinder 18*fr* and the left rear wheel cylinder 18*rl* provided in the second brake circuit 20*b*, independently from the operation of the brake pedal 16 performed by the driver.

In other words, this configuration allows the brake operation performed by the driver through the second brake circuit 20*b* to be maintained even while a control is performed on the first brake circuit 20*a*, and allows the brake operation performed by the driver through the first brake circuit 20*a* to be maintained even while a control is performed on the second brake circuit 20*b*. Hence, the brake driver 15 is so configured as to be able to reduce a sense of strangeness which the driver may feel upon performing the brake operation in a case where a braking force control performed solely by one of the first brake circuit 20*a* and the second brake circuit 20*b* takes place.

A description is given next of the brake controller 30.

The brake controller 30 may be coupled to sensors such as a vehicle speed sensor 31 that detects a vehicle speed V, a steering angle sensor 32 that detects a steering angle θH, an accelerator position sensor 33 that detects an accelerator position θA, and an accelerator pedal stroke sensor 34 that detects a speed of pressing down on an accelerator pedal, i.e., an accelerator pedal pressing down speed DPA. The brake controller 30 may also be coupled to an engine controller 35 that executes various controls on the engine 2. The various controls to be executed by the engine controller 35 may include a fuel injection control and a traction control that suppresses an idling of the left front wheel 13*fl*, the right front wheel 13*fr*, the left rear wheel 13*rl*, and the right rear wheel 13*rr*.

The brake controller 30 detects the start of the vehicle 1 in which steering is performed, i.e., the steered start, of the vehicle 1 on the basis of input signals obtained by the foregoing sensors. When the steered start of the vehicle 1 is detected, the brake controller 30 controls the first brake circuit 20*a* or the second brake circuit 20*b* of the foregoing brake system to thereby apply the braking force to a front wheel located on the inner side of the turning of the vehicle 1, i.e., a "turning inner front wheel" and the braking force to a rear wheel located on the outer side of the turning of the vehicle 1, i.e., a "turning outer rear wheel". The brake controller 30 may so apply the braking force that the braking force to be applied to the turning inner front wheel becomes higher than the braking force to be applied to the turning outer rear wheel. The brake controller 30 may release the braking force applied to the turning inner front wheel and the braking force applied to the turning outer rear wheel after the elapse of a braking force application time. The braking force application time may be set in advance on the basis of one or more of the steering angle θH, the accelerator position θA, and the accelerator pedal pressing down speed DPA, and may serve as a delay time tb of starting reduction of a brake fluid pressure, or a "pressure-reduction starting delay time tb". The braking force Pb to be applied to the turning inner front wheel and the turning outer rear wheel by the brake controller 30, or a "brake fluid pressure control value Pb", may be set in advance on the basis of one or more of the steering angle θH, the accelerator position θA, and the accelerator pedal pressing down speed DPA. Further, in an example where the brake controller 30 has a braking force keeping function, the brake controller 30 may, when the steered start of the vehicle 1 is detected, immediately release only the braking force applied to a front wheel located on the outer side of the turning of the vehicle 1, i.e., a "turning outer front wheel" and the braking force applied to a rear wheel located on the inner side of the turning of the vehicle 1, i.e., a "turning inner rear wheel". In addition, when the steered start of the vehicle 1 is detected in the case where the brake controller 30 has the braking force keeping function, the brake controller 30 may release, after the elapse of the braking force application time (the pressure-reduction starting delay time tb), the braking force that is kept applied to the turning inner front wheel in a stopped state of the vehicle 1 and the braking force that is kept applied to the turning outer rear wheel in the stopped state of the vehicle 1. The braking force keeping function keeps, during the transition from the stopped state to a start state of the vehicle 1, the braking force derived from the stopped state. As described above, the braking force application time (the pressure-reduction starting delay time tb) may be set in advance on the basis of one or more of the steering angle θH, the accelerator position θA, and the accelerator pedal pressing down speed DPA. In one implementation, the brake controller 30 may serve as a "steered start detector", a "controller", and a "braking force keeper".

Figure 3:
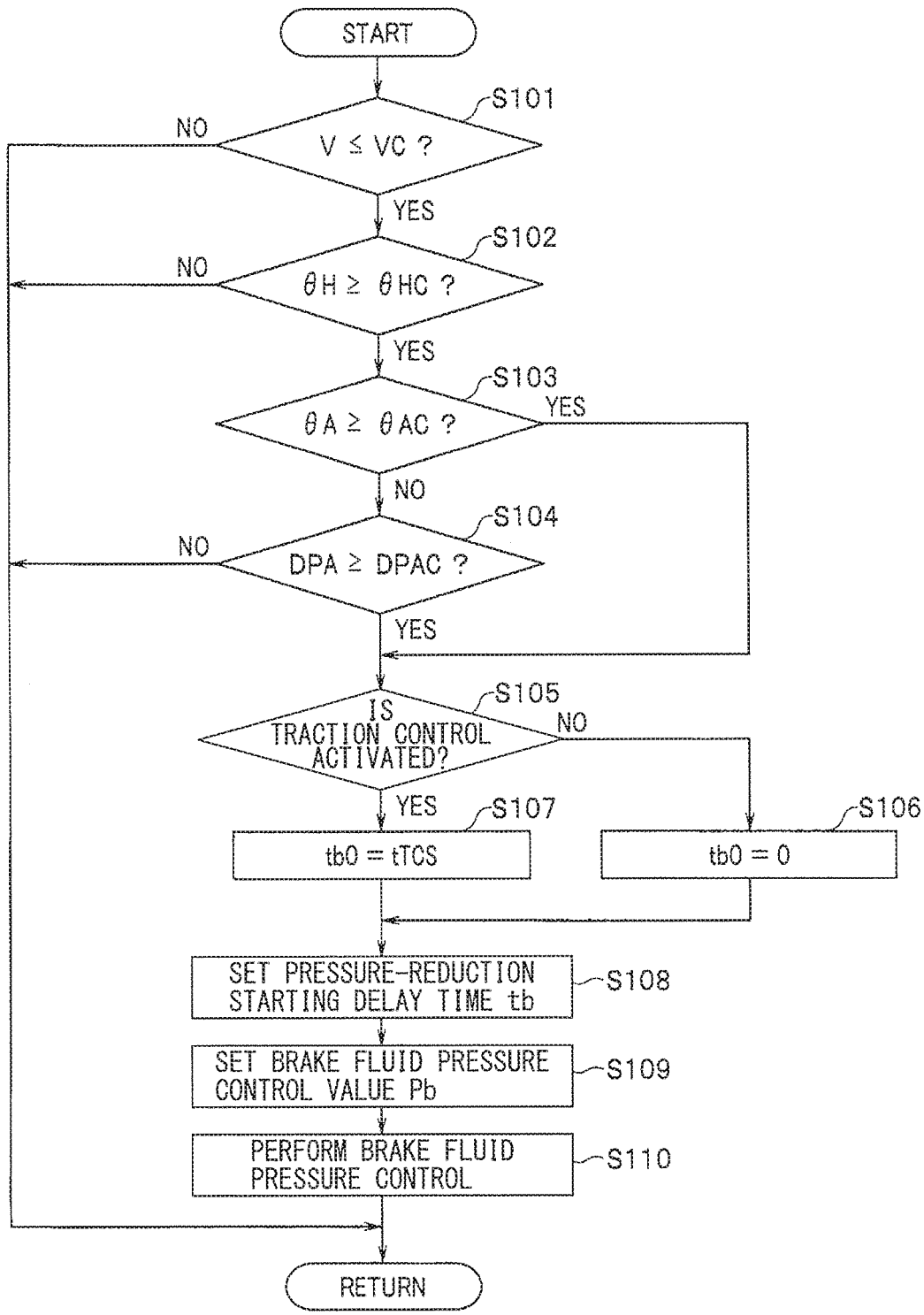
FIG. 3 is a flowchart illustrating an example of a braking force controlling program according to one implementation of the technology.

A description is given next, by referring to a flowchart illustrated by way of example in FIG. 3, of a braking force controlling program to be executed by the brake controller 30.

First, in step S101, a determination may be made as to whether the vehicle speed V is equal to or less than a preset vehicle speed VC (V≤VC). The vehicle speed VC may be set in advance on the basis of an experiment, a calculation, or any other method.

When a result of the determination performed in step S101 indicates that V≤VC is satisfied (S101: YES), a flow may proceed to step S102 in which a determination may be made as to whether the steering angle θH is equal to or greater than a preset steering angle θHC (θH≥θHC). The steering angle θHC may be set in advance on the basis of an experiment, a calculation, or any other method.

When a result of the determination performed in step S102 indicates that θH≥θHC is satisfied (S102: YES), the flow may proceed to step S103 in which a determination may be made as to whether the accelerator position θA is equal to or greater than a preset accelerator position θAC (θA≥θAC). The accelerator position θAC may be set in advance on the basis of an experiment, a calculation, or any other method.

When a result of the determination performed in step S103 indicates that θA≥θAC is satisfied (S103: YES), the flow may proceed to step S105 by determining that the vehicle 1 is in a state of performing the steered start. This is in consideration of a fact that the vehicle speed is low, the steering is performed, and the driver intends to start the vehicle 1.

When the result of the determination performed in step S103 indicates that θA<θAC is satisfied (S103: NO), the flow may proceed to step S104 in which a determination may be made as to whether the accelerator pedal pressing down speed DPA is equal to or greater than a preset accelerator pedal pressing down speed DPAC (DPA≥DPAC). The accelerator pedal pressing down speed DPAC may be set in advance on the basis of an experiment, a calculation, or any other method.

When a result of the determination performed in step S104 indicates that DPA≥DPAC is satisfied (S103: YES), the flow may proceed to step S105 by determining that the vehicle 1 is in the state of performing the steered start. This is in consideration of the fact that the vehicle speed is low, the steering is performed, and the driver intends to start the vehicle 1.

When the result of the determination performed in step S101 indicates that V>VC is satisfied (S101: NO), when the result of the determination performed in step S102 indicates that θH<θHC is satisfied (S102: NO), or when the result of the determination performed in step S103 indicates that θA<θAC is satisfied (S103: NO) but the result of the determination performed in step S104 indicates that DPA<DPAC is satisfied (S104: NO), the braking force controlling program may be terminated by determining that the vehicle 1 is not in the state of performing the steered start. In this case, a normal brake control may be performed.

When the flow proceeds to step S105 from step S103 or S104 by determining that the vehicle 1 is in the state of performing the steered start, a determination may be made as to whether the traction control that suppresses the idling of a wheel is activated by the engine controller 35. When a result of the determination performed in step S105 indicates that the traction control is not active (S105: NO), the flow may proceed to step S106 in which a delay time tb0 of starting reduction of a brake fluid pressure directed to the traction control, or a "traction control pressure-reduction starting delay time tb0", may be set to zero (tb0=0). The traction control pressure-reduction starting delay time tb0 may form part of the pressure-reduction starting delay time tb that is directed to the application of the braking force to the turning inner front wheel and the braking force to the turning outer rear wheel.

When the result of the determination performed in step S105 indicates that the traction control is active (S105: YES), the flow may proceed to step S107 in which the traction control pressure-reduction starting delay time tb0 may be set to tTCS (tb0=tTCS). Note that tTCS may be set in advance on the basis of an experiment, a calculation, or any other method.

The process performed in step S107 allows a time in which the braking force is applied to the turning inner front wheel and the turning outer rear wheel to be long in a case where the traction control is active, thereby making it possible to increase an effect of causing torque down in the engine 2 resulting from the traction control.

After the setting of the traction control pressure-reduction starting delay time tb0 performed in step S106 or S107, the flow may proceed to step S108 in which the pressure-reduction starting delay time tb directed to the application of the braking force to the turning inner front wheel and the braking force to the turning outer rear wheel is set in the following example fashion.

The pressure-reduction starting delay time tb according to the present implementation may be set on the basis of one or more of the steering angle θH, the accelerator position θA, and the accelerator pedal pressing down speed DPA, in addition to whether the foregoing traction control is active or non-active. The pressure-reduction starting delay time tb based on the steering angle θH may be set, as a first delay time tb1 of starting the reduction of the brake fluid pressure (simply referred to as a "first pressure-reduction starting delay time tb1"), by referring to a map illustrated by way of example in FIG. 4A. For example, the map may be set in advance on the basis of an experiment, a calculation, or any other method.

Figure 4A:
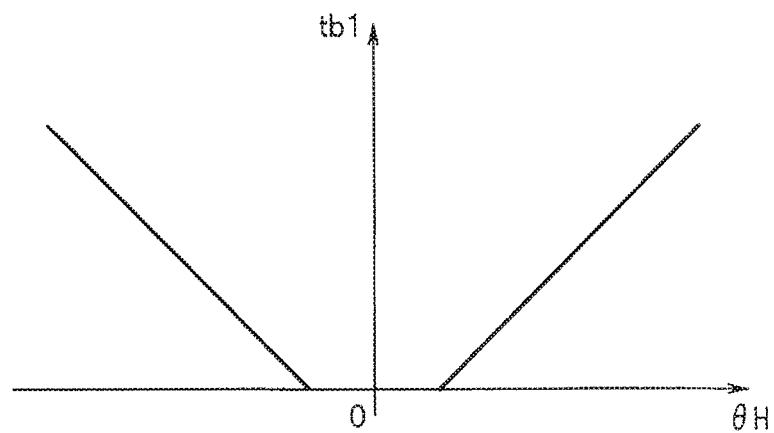

Referring to FIG. 4A, a value of the first pressure-reduction starting delay time tb1 based on the steering angle θH may be so set that the first pressure-reduction starting delay time tb1 becomes longer as an absolute value |θH| of the steering angle θH becomes larger. One reason is to allow a time in which the braking force is to be applied to the turning inner front wheel to be set longer, in consideration of a fact that a yaw moment required to be applied to the vehicle 1 for the turning increases with the increase in the absolute value |θH| of the steering angle θH. Another reason is to improve stability in vehicle behavior by allowing a time in which the braking force is to be applied to the turning outer rear wheel to be set longer, in consideration of a fact that an unstable behavior tends to occur in the vehicle 1 with the increase in the absolute value |θH| of the steering angle θH.

Figure 4B:
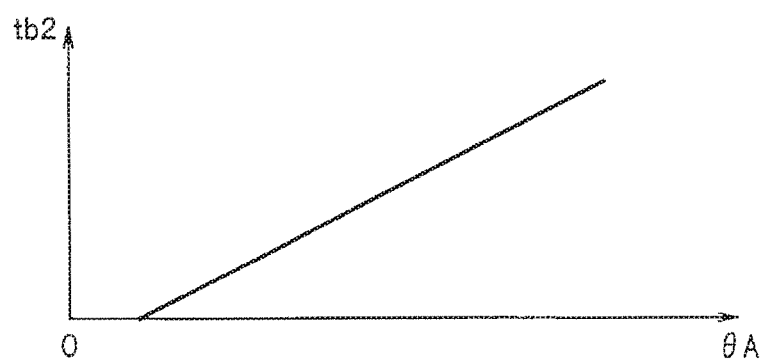

The pressure-reduction starting delay time tb based on the accelerator position θA may be set, as a second delay time tb2 of starting the reduction of the brake fluid pressure (simply referred to as a "second pressure-reduction starting delay time tb2"), by referring to a map illustrated by way of example in FIG. 4B. For example, the map may be set in advance on the basis of an experiment, a calculation, or any other method.

Referring to FIG. 4B, a value of the second pressure-reduction starting delay time tb2 based on the accelerator position θA may be so set that the second pressure-reduction starting delay time tb2 becomes longer with an increase in the accelerator position θA. One reason is to improve stability of the vehicle 1 even when the steered start is performed in a state in which the engine 2 is high in output, by making an increase in output with respect to a road surface gradual and thereby preventing a situation such as a slip of the left front wheel 13*fl*, the right front wheel 13*fr*, the left rear wheel 13*rl*, and the right rear wheel 13*rr*.

Figure 4C:
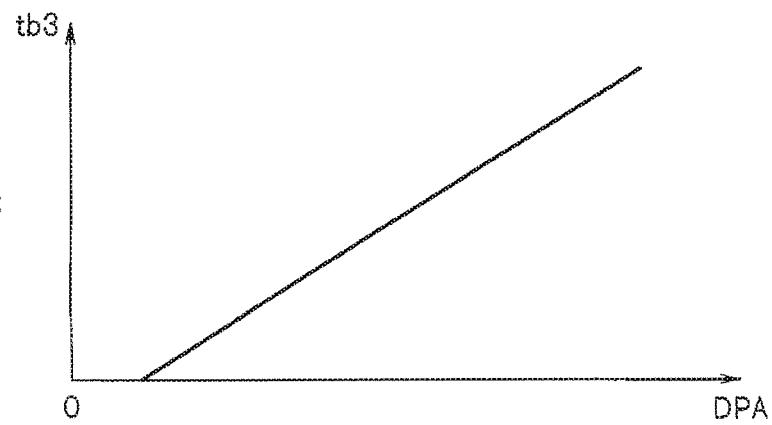

The pressure-reduction starting delay time tb based on the accelerator pedal pressing down speed DPA may be set, as a third delay time tb3 of starting the reduction of the brake fluid pressure (simply referred to as a "third pressure-reduction starting delay time tb3"), by referring to a map illustrated by way of example in FIG. 4C. For example, the map may be set in advance on the basis of an experiment, a calculation, or any other method.

Referring to FIG. 4C, a value of the third pressure-reduction starting delay time tb3 based on the accelerator pedal pressing down speed DPA may be so set that the third pressure-reduction starting delay time tb3 becomes longer as the accelerator pedal pressing down speed DPA becomes higher. One reason is to improve stability of the vehicle 1 even when the steered start is performed in a state in which the engine 2 is high in output or in a state in which the driver suddenly starts the vehicle 1, by making the increase in output with respect to the road surface gradual and thereby preventing a situation such as a slip of a wheel.

Further, the thus-set traction control pressure-reduction starting delay time tb0, first pressure-reduction starting delay time tb1, second pressure-reduction starting delay time tb2, and third pressure-reduction starting delay time tb3 may be added to set a resultant of the addition as the pressure-reduction starting delay time tb (tb=tb0+tb1+tb2+tb3).

Note that the pressure-reduction starting delay time tb according to the present implementation is calculated by the traction control pressure-reduction starting delay time tb0, the first pressure-reduction starting delay time tb1, the second pressure-reduction starting delay time tb2, and the third pressure-reduction starting delay time tb3. In an alternative implementation, any one or any combination of the traction control pressure-reduction starting delay time tb0, the first pressure-reduction starting delay time tb1, the second pressure-reduction starting delay time tb2, and the third pressure-reduction starting delay time tb3 may be used to calculate the pressure-reduction starting delay time tb.

After the setting of the pressure-reduction starting delay time tb performed in step S108, the flow may proceed to step S109 in which the braking force Pb to be applied to the turning inner front wheel and the turning outer rear wheel, or the "brake fluid pressure control value Pb", is set in the following example fashion.

The brake fluid pressure control value Pb according to the present implementation may be set on the basis of one or more of the steering angle θH, the accelerator position θA, and the accelerator pedal pressing down speed DPA. The brake fluid pressure control value Pb based on the steering angle θH may be set, as a first brake fluid pressure control value P1, by referring to a map illustrated by way of example in FIG. 5A. For example, the map may be set in advance on the basis of an experiment, a calculation, or any other method.

Figure 5A:
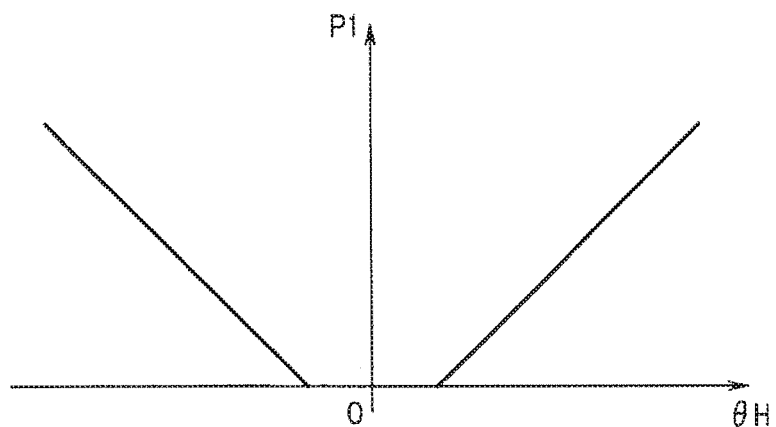

Referring to FIG. 5A, a value of the first brake fluid pressure control value P1 based on the steering angle θH may be so set that the first brake fluid pressure control value P1 becomes higher as the absolute value |θH| of the steering angle θH becomes larger. One reason is to allow the braking force to be applied to the turning inner front wheel to be set higher, in consideration of the fact that the yaw moment required to be applied to the vehicle 1 for the turning increases with the increase in the absolute value |θH| of the steering angle θH. Another reason is to improve stability in vehicle behavior by allowing the braking force to be applied to the turning outer rear wheel to be set higher, in consideration of the fact that the unstable behavior tends to occur in the vehicle 1 with the increase in the absolute value |θH| of the steering angle θH.

Figure 5B:
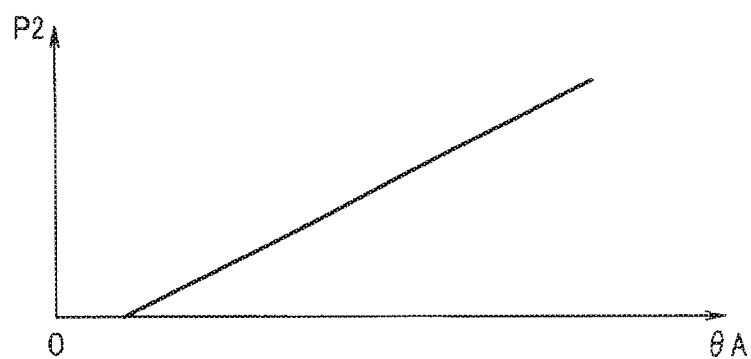

The brake fluid pressure control value Pb based on the accelerator position θA may be set, as a second brake fluid pressure control value P2, by referring to a map illustrated by way of example in FIG. 5B. For example, the map may be set in advance on the basis of an experiment, a calculation, or any other method.

Referring to FIG. 5B, a value of the second brake fluid pressure control value P2 based on the accelerator position θA may be so set that the second brake fluid pressure control value P2 becomes higher with the increase in the accelerator position θA. One reason is to improve stability of the vehicle 1 even when the steered start is performed in the state in which the engine 2 is high in output, by making the increase in output with respect to the road surface gradual and thereby preventing a situation such as a slip of the left front wheel 13*fl*, the right front wheel 13*fr*, the left rear wheel 13*rl*, and the right rear wheel 13*rr*.

Figure 5C:
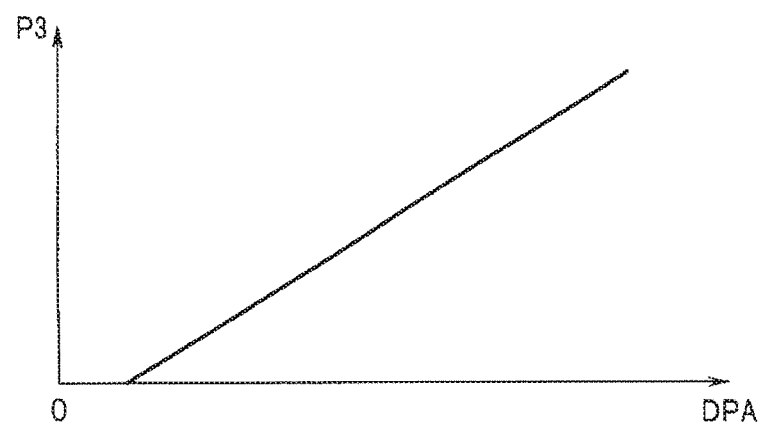

The brake fluid pressure control value Pb based on the accelerator pedal pressing down speed DPA may be set, as a third brake fluid pressure control value P3, by referring to a map illustrated by way of example in FIG. 5C. For example, the map may be set in advance on the basis of an experiment, a calculation, or any other method.

Referring to FIG. 5C, a value of the third brake fluid pressure control value P3 based on the accelerator pedal pressing down speed DPA may be so set that the third brake fluid pressure control value P3 becomes higher as the accelerator pedal pressing down speed DPA becomes higher. One reason is to improve stability of the vehicle 1 even when the steered start is performed in the state in which the engine 2 is high in output or in the state in which the driver suddenly starts the vehicle 1, by making the increase in output with respect to the road surface gradual and thereby preventing a situation such as a slip of the left front wheel 13*fl*, the right front wheel 13*fr*, the left rear wheel 13*rl*, and the right rear wheel 13*rr*.

Further, the thus-set first brake fluid pressure control value P1, second brake fluid pressure control value P2, and third brake fluid pressure control value P3 may be added to set a resultant of the addition as the brake fluid pressure control value Pb (Pb=P+P2+P3).

Note that the brake fluid pressure control value Pb according to the present implementation is calculated by the first brake fluid pressure control value P1, the second brake fluid pressure control value P2, and the third brake fluid pressure control value P3. In an alternative implementation, any one or any combination of the first brake fluid pressure control value P1, the second brake fluid pressure control value P2, and the third brake fluid pressure control value P3 may be used to calculate the brake fluid pressure control value Pb.

In an example where the brake controller 30 according to the present implementation has the braking force keeping function that keeps, during the transition from the stopped state to the start state of the vehicle 1, the braking force derived from the stopped state, the brake controller 30 may immediately release only the braking force applied to the turning outer front wheel and the braking force applied to the turning inner rear wheel in step S109. In addition, in step S109, the brake controller 30 may so maintain the braking force kept applied to the turning inner front wheel in the stopped state and the braking force kept applied to the turning outer rear wheel in the stopped state, that the braking forces applied thereto are released after the elapse of the pressure-reduction starting delay time tb set in above-described step S108. Note that the braking force to be applied to each of the turning inner front wheel and the turning outer rear wheel may alternatively be set on the basis of the brake fluid pressure control value Pb that is set as described above, instead of being based on the braking force that is kept applied to each of the turning inner front wheel and the turning outer rear wheel in the stopped state.

After the setting of the brake fluid pressure control value Pb performed in step S109, the flow may proceed to step S110 in which the brake controller 30 may so output a signal to the brake driver 15 that the pressure-reduction starting delay time tb set in step S108 and the braking force (i.e., the brake fluid pressure control value Pb) set in step S109 are satisfied. By outputting the signal to the brake driver 15, the brake controller 30 may control the first brake circuit 20a or the second brake circuit 20b of the brake system to add the braking force to the turning inner front wheel and the braking force to the turning outer rear wheel.

Figure 6:
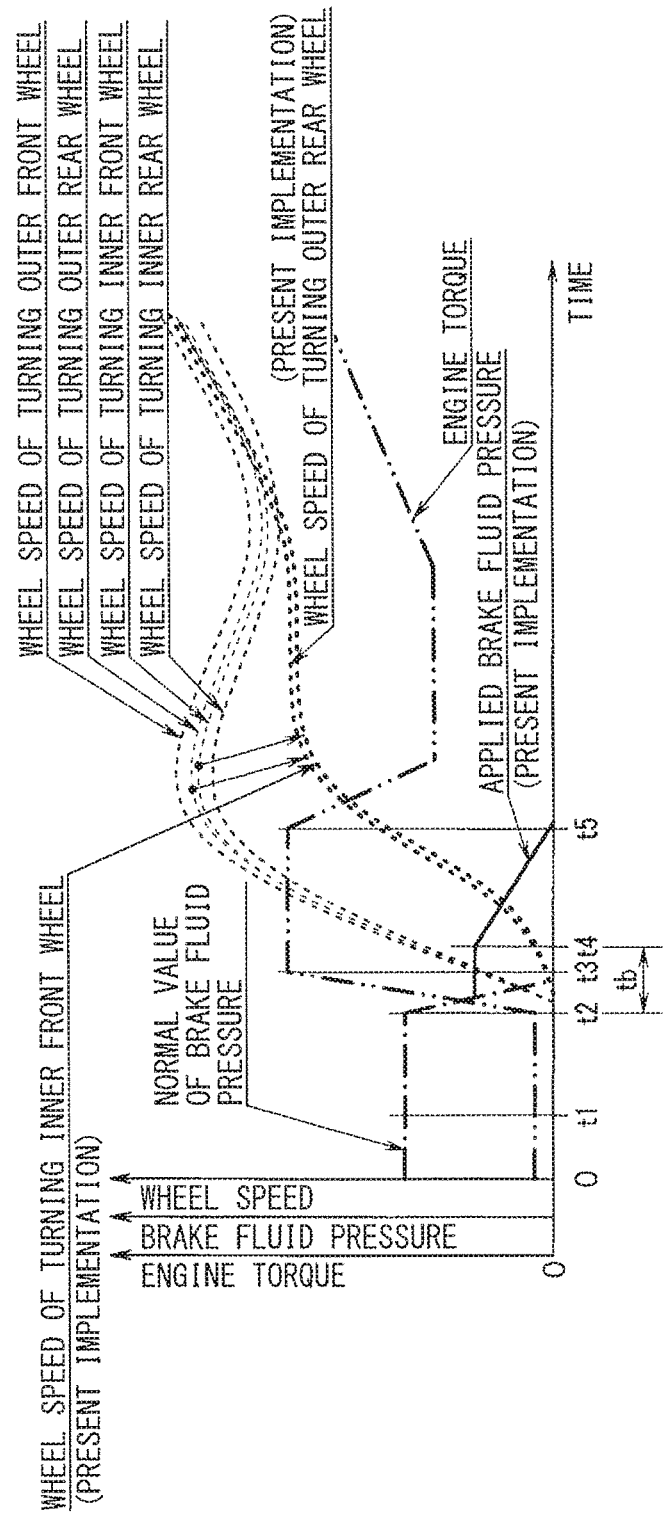
FIG. 6 is a time chart of a wheel speed, a brake fluid pressure, and engine torque that are upon the steered start in a case where a braking force keeping function is activated, according to one implementation of the technology.
Figure 7:
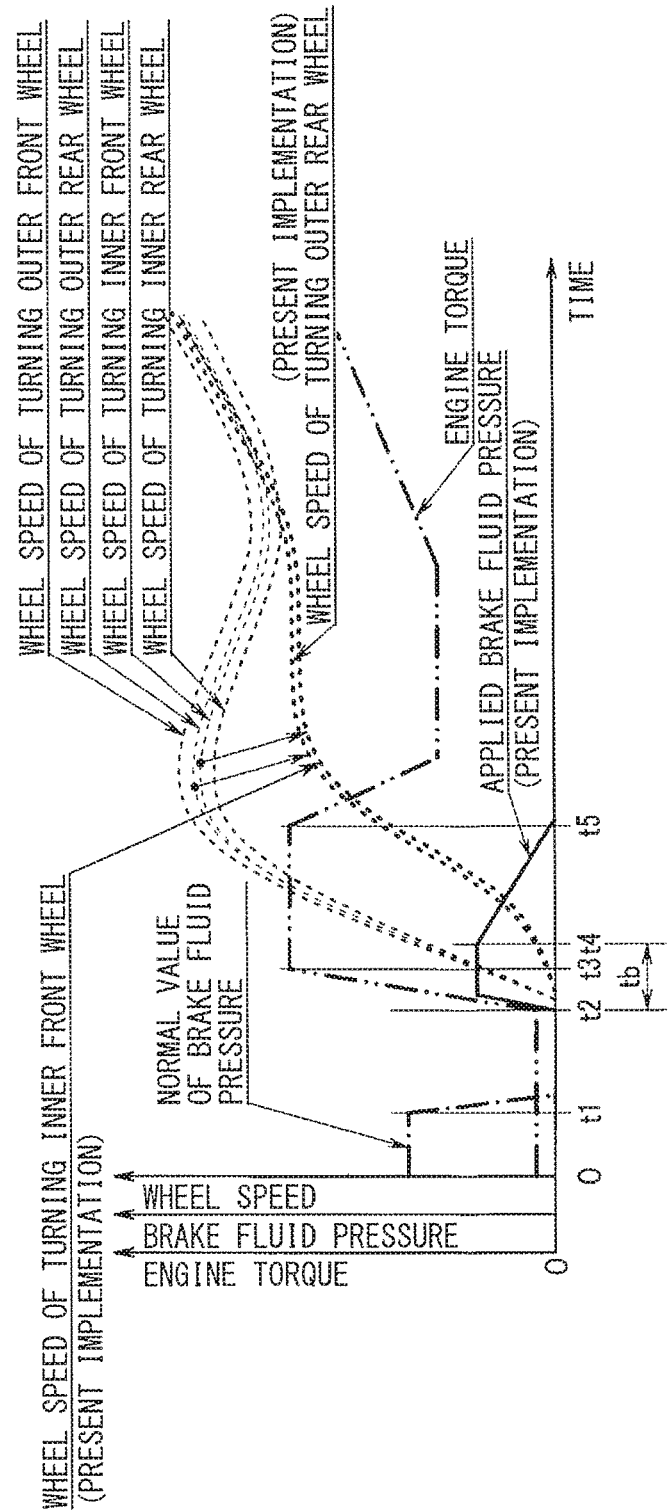
FIG. 7 is a time chart of the wheel speed, the brake fluid pressure, and the engine torque that are upon the steered start in a case where the braking force keeping function is not active, according to one implementation of the technology.

A description is given now, by referring to time charts illustrated in FIGS. 6 and 7, of workings and example effects according to the present implementation.

FIG. 6 is a time chart of a wheel speed, a brake fluid pressure, and engine torque that are upon the steered start in a case where the braking force keeping function is activated. In an illustrated example, even when the brake pedal 16 is turned off at a time point t1, the braking force derived from the stopped state is maintained until the accelerator pedal is turned on and the braking force keeping function is deactivated accordingly at a time point t2.

In a case of an existing vehicle to which one implementation of the technology is not applied, the engine torque increases and the brake fluid pressure applied to the four wheels reduces when the accelerator pedal is turned on and the braking force keeping function is deactivated at the time point t2, increasing the wheel speeds of the four wheels.

Figure 8:
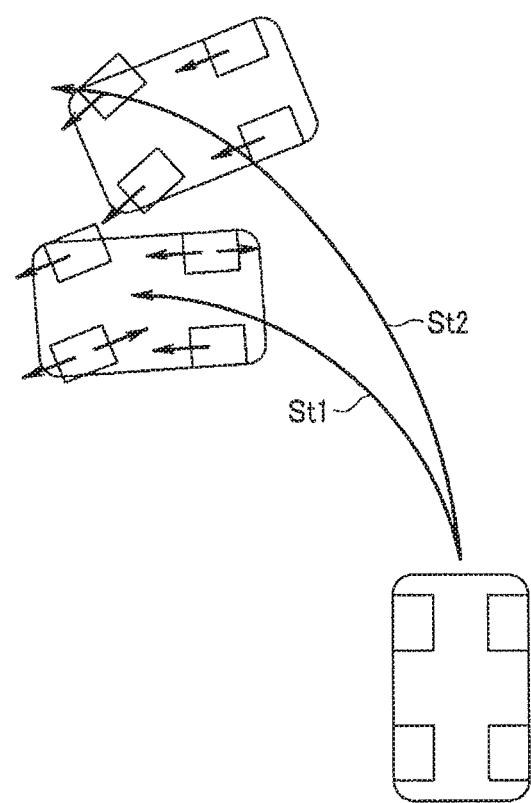
FIG. 8 describes a behavior of a vehicle in a case where the braking force is applied, according to one implementation of the technology.

According to the present implementation, however, when the accelerator pedal is turned on and the state of performing the steered start is detected at the time point t2, only the brake fluid pressure applied to the turning outer front wheel and the turning inner rear wheel is reduced down to zero, whereas the brake fluid pressure applied to the turning inner front wheel and the turning outer rear wheel is caused to maintain the brake fluid pressure based on the brake fluid pressure control value Pb until the time reaches a time point t4, i.e., until the pressure-reduction starting delay time tb elapses. Hence, according to the present implementation, it is possible to improve turning-around capability as illustrated by a trajectory St1 in FIG. 8 as compared with a trajectory St2 according to an existing example through appropriate application of a yaw moment, owing to the braking force that acts on the turning inner front wheel. Further, according to the present implementation, it is possible to improve vehicle stability through effective prevention of a slip, owing to the braking force that acts on the turning outer rear wheel. Accordingly, it is possible to allow the steered start to be performed moderately even when a road is low in friction coefficient μ, and thereby to prevent occurrence of plow and prevent a wheel from being caught upon the start of the vehicle 1.

FIG. 7 is a time chart of the wheel speed, the brake fluid pressure, and the engine torque that are upon the steered start in a case where the braking force keeping function is not active. In an illustrated example, the brake fluid pressure applied to the four wheels (i.e., the left front wheel 13fl, the right front wheel 13fr, the left rear wheel 13rl, and the right rear wheel 13rr) reduces when the brake pedal 16 is turned off at the time point t1.

In a case of an existing vehicle to which one implementation of the technology is not applied, the engine torque increases when the accelerator pedal is turned on at the time point t2, increasing the wheel speeds of the four wheels, i.e., the left front wheel 13fl, the right front wheel 13fr, the left rear wheel 13rl, and the right rear wheel 13rr.

According to the present implementation, however, when the accelerator pedal is turned on and the state of performing the steered start is detected at the time point t2, the brake fluid pressure based on the brake fluid pressure control value Pb is applied to the turning inner front wheel and the turning outer rear wheel until the time reaches the time point t4, i.e., until the pressure-reduction starting delay time tb elapses. Hence, according to the present implementation, it is possible to improve the turning-around capability as illustrated by the trajectory St1 in FIG. 8 as compared with the trajectory St2 according to an existing example through the appropriate application of a yaw moment, owing to the braking force that acts on the turning inner front wheel. Further, according to the present implementation, it is possible to improve the vehicle stability through the effective prevention of a slip, owing to the braking force that acts on the turning outer rear wheel. Accordingly, it is possible to allow the steered start to be performed moderately even when the road is low in friction coefficient μ, and thereby to prevent the occurrence of plow and prevent a wheel from being caught upon the start of the vehicle 1.

In addition, it is possible to make the slip of the turning inner front wheel and the turning outer rear wheel moderate even before the torque down by means of the traction control takes place as illustrated by a time point t5 in FIGS. 6 and 7, owing to the brake fluid pressure applied to the turning inner front wheel and the turning outer rear wheel. It is thereby possible to further increase the effect of causing the torque down resulting from the traction control.

Further, according to the present implementation of the technology, a timing in which the brake fluid pressure applied to the turning inner front wheel and the turning outer rear wheel is released and a timing in which the brake fluid pressure applied to the turning outer front wheel and the turning inner rear wheel is released are shifted from each other, upon the steered start of the vehicle 1. Hence, it is possible to reduce a peak level of a noise caused by the brake dragging upon the steered start of the vehicle 1, and thereby to reduce a sense of discomfort which the driver may feel.

Incidentally, it is necessary to shut off the pressure of the master cylinder 17 resulting from the operation of the brake pedal 16 performed by the driver in a case of automatically controlling the brake fluid pressure to be applied to each wheel. Shutting off the brake circuit in this way, however, may possibly give the driver a sense of strangeness with regard to an operational feeling and operability of the brake pedal 16. In contrast, according to the present implementation, one of the first brake circuit 20a and the second brake circuit 20b of the brake system configured by the X piping may be controlled to apply the braking force to the turning inner front wheel and the braking force to the turning outer rear wheel. Hence, it is possible to reduce the sense of strangeness which the driver may feel with regard to the operational feeling and the operability of the brake pedal 16.

According to the present implementation, it is therefore possible to improve the turning-round capability through the appropriate application of a yaw moment and the vehicle stability through the effective prevention of a slip both upon the steered start of the vehicle 1 without causing the driver to feel a sense of dragging and without causing the driver to sense a braking abnormal noise, even for the vehicle having the braking force keeping function.

The brake controller 30 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the brake controller 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the brake controller 30 illustrated in FIG. 1.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle braking force controlling apparatus comprising:
at least one processor; and
a machine-readable medium storing instructions, which when executed by the at least one processor, cause the at least one processor to perform operations comprising:
detecting, based on a driving state of a vehicle that is detected by one or more sensors, a steered start in which the vehicle starts moving from a stopped state while a steering wheel of the vehicle is turned, the vehicle having a plurality of wheels that moves according to the steering wheel of the vehicle, the plurality of wheels including a set of front wheels and a set of rear wheels; and
applying, in response to detecting the steered start of the vehicle, braking force to a turning inner front wheel of the set of front wheels and braking force to a turning outer rear wheel of the set of rear wheels, wherein
the turning inner front wheel which is located on an inner side of a turn made by the vehicle when turning the steering wheel, and
the turning outer rear wheel which is located on an outer side of the turn made by the vehicle when turning the steering wheel.

2. The vehicle braking force controlling apparatus according to claim 1, wherein the braking force applied to the turning inner front wheel and the braking force applied to the turning outer rear wheel are each set in advance on a basis of one or more of a steering angle, an accelerator position, and a speed of pressing down on an accelerator pedal of the vehicle.

3. The vehicle braking force controlling apparatus according to claim 2, wherein the braking force applied to the turning inner front wheel and the braking force applied to the turning outer rear wheel are released after an elapse of a braking force application time, the braking force application time is set in advance on a basis of one or more of a steering angle, an accelerator position, and a speed of pressing down on an accelerator pedal of the vehicle.

4. The vehicle braking force controlling apparatus according to claim 3, wherein the the braking force application time is set to be longer when a traction control that prevents idling of the plurality of wheels is activated.

5. The vehicle braking force controlling apparatus according to claim 2, wherein
the vehicle includes, as the plurality of wheels, a left front wheel, a right front wheel, a left rear wheel, and a right rear wheel, and
the vehicle includes a brake system comprising a X piping system, the brake system including a first brake circuit that performs braking of the left front wheel and the right rear wheel and a second brake circuit that performs braking of the right front wheel and the left rear wheel.

6. The vehicle braking force controlling apparatus according to claim 1, wherein the braking force applied to the turning inner front wheel and the braking force applied to the turning outer rear wheel are released after an elapse of a braking force application time, the braking force application time is set in advance on a basis of one or more of a steering angle, an accelerator position, and a speed of pressing down on an accelerator pedal of the vehicle.

7. The vehicle braking force controlling apparatus according to claim 6, wherein the the braking force application time is set to be longer when a traction control that prevents idling of the plurality of wheels is activated.

8. The vehicle braking force controlling apparatus according to claim 1, wherein
the vehicle includes, as the plurality of wheels, a left front wheel, a right front wheel, a left rear wheel, and a right rear wheel, and
the vehicle includes a brake system comprising a X piping system, the brake system including a first brake circuit that performs braking of the left front wheel and the right rear wheel and a second brake circuit that performs braking of the right front wheel and the left rear wheel.

9. A vehicle braking force controlling apparatus comprising:
at least one processor; and
a machine-readable medium storing instructions, which when executed by the at least one processor, cause the at least one processor to perform operations comprising:
detecting, based on a driving state of a vehicle, a steered start in which the vehicle starts moving from a stopped state while a steering wheel of the vehicle is turned, the vehicle having a plurality of wheels; and
in response to detecting the steered start of the vehicle:
releasing only braking force applied to a turning outer front wheel and braking force applied to a turning inner rear wheel; and
applying braking force to a turning inner front wheel and braking force to a turning outer rear wheel,
wherein, during a transition from the stopped state of the vehicle to a moving state of the vehicle, braking force derived from the stopped state is kept, and
wherein the turning outer front wheel is a front wheel of the plurality of wheels, the turning outer front wheel is located on outer side of the turn made by the vehicle when turning the steering wheel,
wherein the turning inner rear wheel is a rear wheel of the plurality of wheels, the turning inner rear wheel is located on inner side of the turn made by the vehicle when turning the steering wheel,
wherein the turning inner front wheel is a front wheel of the plurality of wheels, the turning inner front wheel is located on the inner side of the turn made by the vehicle when turning the steering wheel, and
wherein the turning outer rear wheel is a rear wheel of the plurality of wheels, the turning outer rear wheel is located on the outer side of the turn made by the vehicle when turning the steering wheel.

10. The vehicle braking force controlling apparatus according to claim 9, wherein the braking force applied to the turning inner front wheel and the braking force applied to the turning outer rear wheel are each set in advance on a basis of one or more of a steering angle, an accelerator position, and a speed of pressing down on an accelerator pedal of the vehicle.

11. The vehicle braking force controlling apparatus according to claim 10, wherein the braking force applied to the turning inner front wheel and the braking force applied to the turning outer rear wheel are released after an elapse of a braking force application time, the braking force application time is set in advance on a basis of one or more of a steering angle, an accelerator position, and a speed of pressing down on an accelerator pedal of the vehicle.

12. The vehicle braking force controlling apparatus according to claim 11, wherein the braking force application time is set to be longer when a traction control that prevents idling of the plurality of wheels is activated.

13. The vehicle braking force controlling apparatus according to claim 10, wherein
the vehicle includes, as the plurality of wheels, a left front wheel, a right front wheel, a left rear wheel, and a right rear wheel, and
the vehicle includes a brake system comprising a X piping system, the brake system including a first brake circuit that performs braking of the left front wheel and the right rear wheel and a second brake circuit that performs braking of the right front wheel and the left rear wheel.

14. The vehicle braking force controlling apparatus according to claim 9, wherein the braking force applied to the turning inner front wheel and the braking force applied to the turning outer rear wheel respectively comprise the braking force maintained on the turning inner front wheel since the stopped state of the vehicle and the braking force maintained on the turning outer rear wheel since the stopped state of the vehicle.

15. The vehicle braking force controlling apparatus according to claim 9, wherein the braking force applied to the turning inner front wheel and the braking force applied to the turning outer rear wheel are released after an elapse of a braking force application time, the braking force application time is set in advance on a basis of one or more of a steering angle, an accelerator position, and a speed of pressing down on an accelerator pedal of the vehicle.

16. The vehicle braking force controlling apparatus according to claim 15, wherein the the braking force application time is set to be longer when a traction control that prevents idling of the plurality of wheels is activated.

17. The vehicle braking force controlling apparatus according to claim 9, wherein
the vehicle includes, as the plurality of wheels, a left front wheel, a right front wheel, a left rear wheel, and a right rear wheel, and
the vehicle includes a brake system comprising a X piping system, the brake system including a first brake circuit that performs braking of the left front wheel and the right rear wheel and a second brake circuit that performs braking of the right front wheel and the left rear wheel.

18. A vehicle braking force controlling apparatus comprising circuitry configured to
detect, based on a driving state of a vehicle, a steered start in which the vehicle starts moving from a stopped state while a steering wheel of the vehicle is turned, the vehicle having a plurality of wheels, and
apply braking force to a turning inner front wheel and braking force to a turning outer rear wheel when the steered start of the vehicle is detected, the turning inner front wheel being a front wheel of the plurality of wheels which is located on inner side upon turning of the vehicle, the turning outer rear wheel being a rear wheel of the plurality of wheels which is located on outer side upon the turning of the vehicle,
wherein the braking force applied to the turning inner front wheel and the braking force applied to the turning outer rear wheel are each set in advance based on one or more of a steering angle, an accelerator position, and a speed of pressing down on an accelerator pedal of the vehicle.

19. A vehicle braking force controlling apparatus comprising circuitry configured to
detect, based on a driving state of a vehicle, a steered start in which the vehicle starts moving from a stopped state while a steering wheel of the vehicle is turned, the vehicle having a plurality of wheels, and
release immediately only braking force applied to a turning outer front wheel and braking force applied to a turning inner rear wheel and apply braking force to a turning inner front wheel and braking force to a turning outer rear wheel when the steered start of the vehicle is detected, wherein, during a transition from the stopped state of the vehicle to the start state of the vehicle, braking force derived during the stopped state is maintained, the turning outer front wheel is a front wheel of the plurality of wheels, the turning outer front wheel is located on outer side of the turn made by the vehicle when turning the steering wheel, the turning inner rear wheel is a rear wheel of the plurality of wheels, the turning inner rear wheel is located on inner side of the turn made by the vehicle when turning the steering wheel, the turning inner front wheel is a front wheel of the plurality of wheels, the turning inner front wheel is located on the inner side upon of the turn made by the vehicle when turning the steering wheel, and the turning outer rear wheel is a rear wheel of the plurality of wheels, the turning outer rear wheel is located on the outer side of the turn made by the vehicle when turning the steering wheel.

\* \* \* \* \*